No. 702,346. Patented June 10, 1902.
C. M. DAY.
LOOM SHIPPER MECHANISM.
(Application filed Dec. 26, 1901.)
(No Model.)
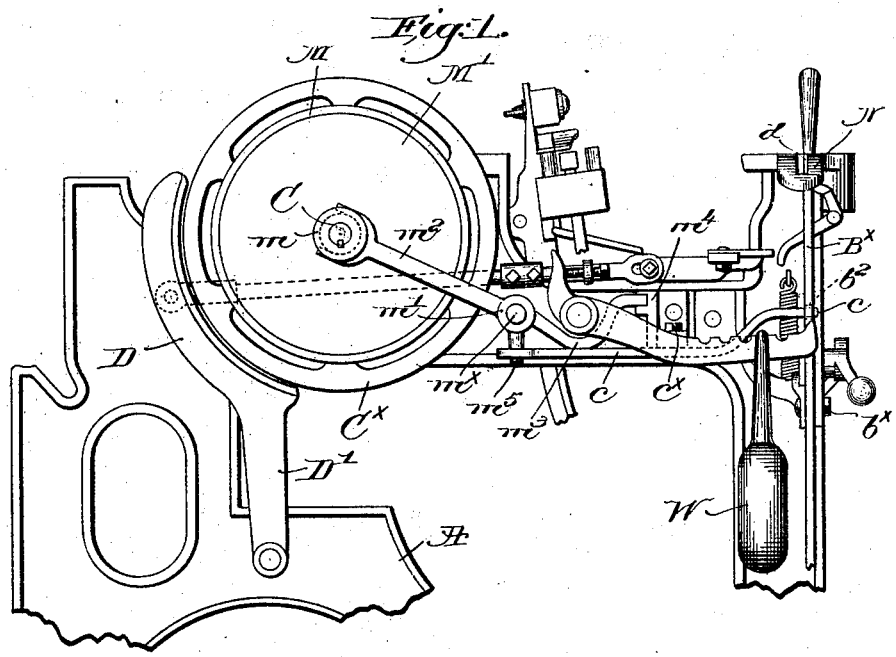
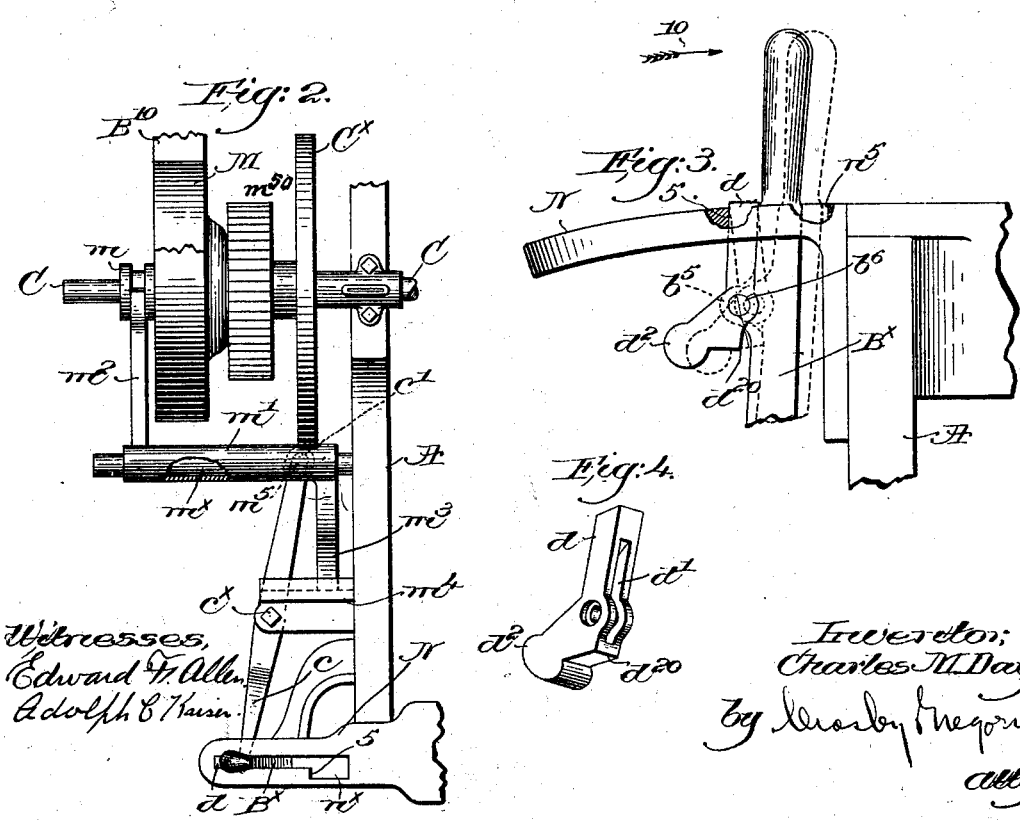

UNITED STATES PATENT OFFICE.

CHARLES M. DAY, OF HOPEDALE, MASSACHUSETTS, ASSIGNOR TO DRAPER COMPANY, OF HOPEDALE, MASSACHUSETTS, A CORPORATION OF MAINE.

LOOM SHIPPER MECHANISM.

SPECIFICATION forming part of Letters Patent No. 702,346, dated June 10, 1902.

Application filed December 26, 1901. Serial No. 87,150. (No model.)

*To all whom it may concern:*

Be it known that I, CHARLES M. DAY, a citizen of the United States, and a resident of Hopedale, county of Worcester, State of Massachusetts, have invented an Improvement in Loom Shipper Mechanism, of which the following description, in connection with the accompanying drawings, is a specification, like letters on the drawings representing like parts.

The actuating means of a loom is commonly governed by a shipper which is held in running position by a suitable holding device—as, for instance, the notched plate of well-known construction—the driving-belt being maintained on the fast pulley so long as the shipper is in the notch, the term "running position" being commonly employed to indicate the fact that the shipper is in the notch in position to permit the loom to run. Release of the shipper from the holding-notch operates through suitable connections to ship the belt from the fast to the loose pulley. When the attendant wishes to start the loom, he pulls the shipper-lever over until it snaps into the holding-notch and is thereby maintained in running position.

Clutch devices are coming into vogue as a convenient means for insuring quick and positive application or withdrawal of power for looms, and in order to obtain a rapid and complete application of the power when starting it is necessary that the clutch shall be set initially more powerfully than is requisite after the inertia of the loom has been overcome so far as concerns the usual sliding collar and yoke employed to operate the clutch. In ordinary usage the yoke is swung by the operator to move the collar, and thereby set the clutch, and then when the operator removes his hand the yoke is freed and the pressure between it and the collar is relaxed, so that while the clutch remains set there is no objectionable friction set up between the yoke and collar. When using a clutch on a loom, however, the conditions are different, because the yoke or part in immediate engagement with the collar is moved through the agency of the shipper, and when the latter is swung into position to set the clutch it is snapped into the notch of the holding-plate and held. Thus ordinarily there would be nothing to prevent the collar and yoke member from remaining in close rubbing engagement after the clutch had been set, and the friction thus created would be very appreciable and, being unnecessary, a loss of power would result. The shipper must be held to prevent it from immediately returning to position to stop the loom, and if it be moved by the operator into the notch of the holding-plate the objectionable and wasteful friction referred to will be present just as long as the clutch remains "set." Now with apparatus of such character if the movement of the shipper to set the clutch and start the loom be continued beyond its normal running position the clutch will be properly set. The slight retrograde movement of the shipper thereafter to normal running position will not release the clutch; but it will relieve the pressure between the collar and the coöperating yoke member, so that the objectionable friction referred to is obviated. Such results cannot be fulfilled with any certainty by the use of the ordinary shipper and holding device, as the requisite movement to be given the shipper is left to the volition of the attendant, and owing to haste or carelessness on his part the proper and complete setting of the clutch is not attained with certainty.

My present invention has for its object the production of means whereby the shipper cannot be brought into engagement with its holding device until the clutch has been properly set to effect the desired initial action, and when the shipper assumes its normal position thereafter the clutch will be thereby maintained in operative condition while the loom is running; but the pressure between the collar and the member immediately coöperating therewith is relieved.

Figure 1 is a left-hand side elevation of a sufficient portion of a loom to be understood with one embodiment of my invention applied thereto, the shipper being shown in running position. Fig. 2 is a plan view of the clutch and the connections between it and the shipper, the latter being shown in stopping position. Fig. 3 is an enlarged detail, in front elevation and partly broken out, of the shipper and one means for insuring the proper movement thereof to completely set the clutch when the loom is started; and Fig. 4 is a perspective view of the dog to be described.

Referring to Fig. 1, the loom side A, the crank-shaft C, brake wheel or disk $C^\times$, fast thereon, the notched holding-plate N for the shipper $B^\times$, the brake D on the pivotally-mounted arm D', and the brake-actuating means, operated by or through the weight W when the power is thrown off the loom, may be and are all substantially as in United States Patent No. 593,070, dated November 2, 1897. A clutch of suitable construction—such, for instance, as shown in United States Patent No. 693,954, granted to me February 25, 1902—is mounted on the crank-shaft, the loose member M being rotated continuously from any suitable source of power (not shown) by a belt $B^{10}$, Fig. 2, the coöperating clutch member M', Fig. 1, being mounted to rotate with the crank-shaft, an annularly-grooved collar $m$, keyed to the shaft, being operatively connected with the devices (not shown) for engaging or disengaging the said clutch members, and which may be all as shown in said Patent No. 693,954. A sleeve $m'$, having a yoke-like arm $m^2$, engaging the collar $m$ and a bent arm $m^3$ to enter and move in a guide-bracket $m^4$, is mounted to slide on a stud $m^\times$ on the loom side, said sleeve having a depending stud $m^5$ to enter a slot $c'$ in a lever $c$, fulcrumed at $c^\times$ on a part of the bracket $m^4$, Figs. 1 and 2. The front end of the lever $c$ loosely enters a hole $b^2$ in the shipper, Fig. 1, above the fulcrum $b^\times$ of the latter, so that movement of the shipper to running position will move the sleeve $m'$ outward and set the clutch. A gear $m^{50}$ is shown in Fig. 2 to transmit rotation of the shaft C to other portions of the loom.

I have herein provided means to compel the attendant when starting the loom to move the shipper a sufficient distance beyond running position to insure a quick and complete initial action of the clutch, and until such excess or additional movement is made the shipper cannot enter the usual holding-notch $n^\times$ of the plate N.

Referring more particularly to Fig. 3, the shipper is shown as having an ear $b^5$ on its outer edge, which enters a slot $d'$, Fig. 4, in an upturned dog $d$, pivoted on the ear by a pin $b^6$, the dog projecting through the slotted plate N. The lower end $d^2$ of the dog is enlarged and extended outward away from the shipper, so that the normal tendency of the dog is to swing away from the adjacent portion of the shipper, as shown in dotted lines, Fig. 3, leaving a clearance-space between them. To start the loom, the attendant throws the shipper in the direction of the arrow 10, Fig. 3, and in order to lock or hold the shipper in the notch $n^5$ such movement must be continued beyond the holding end 5 of the notch far enough to permit the dog $d$ to enter the notch, it being remembered that the dog is at such time swung out from the shipper, as shown in dotted lines, Fig. 3. When the dog and shipper enter the notch $n^5$, the attendant releases his hold upon the shipper, a quick and complete setting of the clutch having then been effected and the loom started, the outer edge of the dog engaging the outer end 5 of the notch. When the shipper is thus released, it moves back against the dog, as shown in full lines, Fig. 3, and so remains while the loom is running, such retrograde movement of the shipper equal to the clearance between it and the dog serving to reduce or relieve the pressure between the collar $m$ and the yoke-like arm $m^2$, thereby preventing unnecessary friction or grinding of such parts while the loom is running.

The additional or excess movement of the shipper beyond running position is determined by the width of the dog $d$ and the normal clearance between the adjacent edges of the dog and shipper, a stop-shoulder $d^{20}$ on the dog, by engagement with the shipper, governing the clearance.

Release of the shipper is effected in any usual way and is not changed in any way by the novel structure herein shown and described.

My invention is herein illustrated in one practical embodiment thereof, and changes or variations in the construction and arrangement may be made by those skilled in the art without departing from the spirit and scope of my invention.

Having fully described my invention, what I claim as new, and desire to secure by Letters Patent, is—

1. In a loom, actuating means, including a clutch, a shipper operatively connected therewith, a device to hold the shipper in running position, and means to normally compel a definite movement thereof beyond such position as a prerequisite to engagement with the holding device, to insure complete and rapid initial action of the clutch.

2. In a loom, actuating means, including a clutch, a shipper operatively connected therewith, a device to hold the shipper in running position, and means to normally compel a definite movement thereof beyond such position as a prerequisite to engagement with the holding device, and to thereafter permit limited retrograde movement of the shipper to running position, for the purposes set forth.

3. In a loom, actuating means, including a clutch, a shipper operatively connected therewith, a notched holding-plate for the shipper, and means to normally compel a definite movement of the latter beyond its running position prior to engagement with the outer end of the holding notch, to thereby insure effective and rapid initial action of the actuating means when the clutch is set.

4. In a loom, actuating means, including a clutch, a shipper operatively connected therewith, a device to hold the shipper in running position, and means on the shipper to normally compel a definite movement thereof beyond such running position as a prerequisite to engagement with the holding device.

5. In a loom, actuating means, including a clutch, a shipper operatively connected therewith, a device to hold the shipper in running position, and a movable dog on the holding side of the shipper normally leaving a clearance between them, whereby movement of the shipper to start the loom must be extended sufficiently to permit engagement of the dog with the holding device, to effect complete and quick initial action of the clutch, retrogression of the shipper to running position being permitted by the clearance, to relieve the operative connection between the clutch and shipper from undue friction.

6. In a loom, actuating means, including a clutch, a shipper operatively connected therewith, a notched holding-plate for the shipper, and a gravity-controlled dog on the holding side of the shipper, normally swung out to leave a clearance between it and the shipper, whereby movement of the shipper to start the loom must be extended sufficiently to permit entrance of the dog into the holding-notch, to effect complete and rapid initial action of the clutch, the clearance permitting an equal retrograde movement of the shipper to running position thereafter, to relieve the operative connection between the clutch and shipper from undue friction.

In testimony whereof I have signed my name to this specification in the presence of two subscribing witnesses.

CHARLES M. DAY.

Witnesses:
GEORGE OTIS DRAPER,
ERNEST W. WOOD.